C. E. STELLER.
Colter.

No. 203,668. Patented May 14, 1878.

WITNESSES:
O. B. Erwin
Chas. Beyer.

INVENTOR:
Charles E. Steller
By Jas. B. Erwin
Attorney

UNITED STATES PATENT OFFICE.

CHARLES E. STELLER, OF MILWAUKEE, WISCONSIN.

IMPROVEMENT IN COLTERS.

Specification forming part of Letters Patent No. 203,668, dated May 14, 1878; application filed January 28, 1878.

*To all whom it may concern:*

Be it known that I, CHARLES E. STELLER, of the city of Milwaukee, in the county of Milwaukee and State of Wisconsin, have invented certain new and useful Improvements in Rotary Plow-Colters; and I do hereby declare that the following is a full, clear, and exact description of my invention, which will enable others skilled in the art to which it pertains to make and use the same, reference being had to the accompanying drawing, and to the letters of reference marked thereon, which form a part of this specification.

Figure 1:
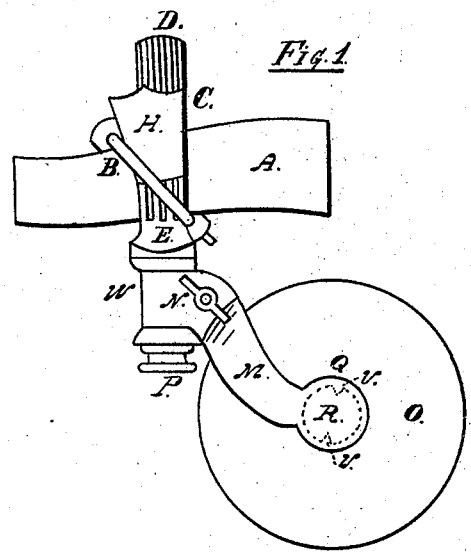
Figure 2:
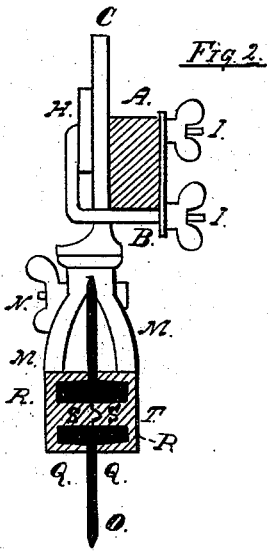
Figure 3:
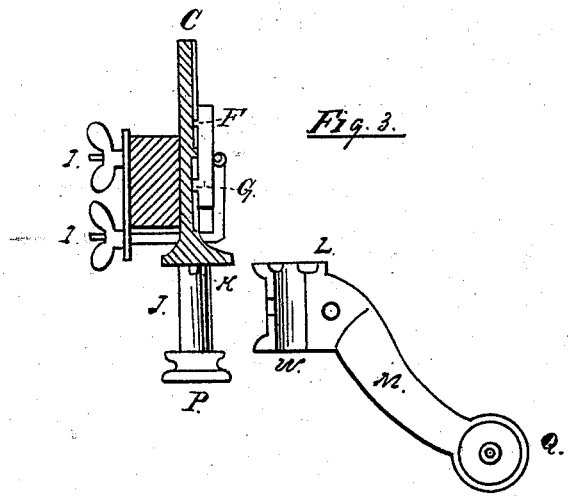

Figure 1 of the accompanying drawing represents a side view of my colter attached to a plow-beam. Fig. 2 represents a sectional end view of the same. Fig. 3 represents a sectional view of the shank, showing the lugs of the adjusting-block as engaged in the grooves of the shank, with one arm of the yoke detached.

The object of my invention is to furnish an improved rotary colter for plows, which shall be so constructed that sand cannot get to and wear its journals, which shall be provided with a device by which the shank is adjusted nearer to or farther from the plow-beam, and by means of which a fastening-clasp of a given width may be attached to wide or narrow beams without the aid of wedges, &c., and which shall be simple in construction and convenient and effective in use, all of which is further described by reference to the accompanying drawing, in which—

A represents the plow-beam, to which the upper part of the shank C is secured by a clasp, B. The shank C is provided upon both of its sides with adjusting-grooves D and E, for the reception of the lugs F and G upon the adjusting-block H, by means of which the shank may be held in a vertical position regardless of the inclination of the clasp. The block being placed against the upper arm of the clasp, the lugs F and G are adjusted in such of the grooves as will secure the shank in a vertical position, as shown, when the clasp is tightened by turning the nuts I, and the colter is thus made permanent. The journal J is eccentric to the shank, so that the colter may be varied in its adjustments nearer to or farther from land-side of the plow by turning the opposite side of the shank toward the beam. There are similar grooves, D and E, upon the opposite side of the shank C, so that when turned over the lugs of the adjusting-block will engage therein; also, in the manner described, a still greater variation of the adjustment of the colter may be obtained by placing the block H between the shank and the beam. The journal J is provided with shoulders K, which operate in the slots L, and limit and check the turning movement of the colter. M is a yoke, constructed in two pieces, which, when they are secured together, form a box, W, for the journal J. The yoke is secured to the journal J and colter-wheel O by bolt N, by which the arms are held together. The journal J may be constructed either in one piece, having a shoulder upon its lower end, or be provided with a nut, P, instead, as desired. Each arm of the yoke M is provided with a cap, Q, which surrounds the hub R of the colter. The mouths of the caps are closely fitted to the sides of the colter, to prevent sand reaching the axle and its bearings. The centers of the caps are each provided with a stud, S, which unite to form the axle of the colter, one of which studs is countersunk in its end, and the other pointed to fit therein. Their ends being thus united gives greater strength and steadiness to the axle. There is a hole, T, extending through the hub from one end to the other, for the reception of the axle, which, being thus protected by the caps, is not liable to be reached and worn away by sand. The hubs R are provided with grooves V for the reception of a thick lubricator, which may be filled before adjusting the caps.

Having thus described my invention, I do not claim for the purpose of this application the shank C, as I am aware that it is not new; but what I do claim as new, and desire to secure by Letters Patent, is—

1. In rotary caster-colters for plows, the shank C, provided with adjusting-grooves D and E on each of its sides, substantially as and for the purpose specified.

2. The block H, provided with lugs F and G, in combination with the shank C, substantially as and for the purpose specified.

3. The yoke M, constructed in two parts, provided with caps Q, studs S, one of which having its end countersunk, and the other pointed to fit therein, and socket L, for the reception of the shoulder K, in combination with the colter-wheel O and shank C, as secured together by bolt N, all substantially as and for the purpose specified.

In testimony that I claim the foregoing as my own I affix my signature in presence of two witnesses.

CHARLES E. STELLER.

Witnesses:
G. C. MARKHAM,
SAML. C. ROSENBERG.